United States Patent
Okubo et al.

(10) Patent No.: US 8,988,002 B2
(45) Date of Patent: Mar. 24, 2015

(54) LIGHTING POWER SUPPLY DEVICE AND METHOD FOR CONTROLLING HOLDING CURRENT

(75) Inventors: Takashi Okubo, Tama (JP); Taro Isogai, Inazawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 357 days.

(21) Appl. No.: 13/282,688

(22) Filed: Oct. 27, 2011

(65) Prior Publication Data

US 2012/0104970 A1 May 3, 2012

(30) Foreign Application Priority Data

Oct. 28, 2010 (JP) .................. 2010-242155
Aug. 26, 2011 (JP) .................. 2011-184280

(51) Int. Cl.
*G05F 1/00* (2006.01)
*H05B 33/08* (2006.01)

(52) U.S. Cl.
CPC .................. *H05B 33/0887* (2013.01)
USPC ............ 315/291; 315/297; 315/292; 315/293

(58) Field of Classification Search
CPC ........... H05B 33/0815; H05B 33/0827; H05B 33/0818; H05B 33/0845; H05B 33/0857; H05B 41/3927; H05B 37/02; H05B 41/2827; H05B 41/2824; H05B 41/2828; Y02B 20/346; Y02B 20/347
USPC ................. 315/291–29, 307, 200 R
See application file for complete search history.

(56) References Cited

U.S. PATENT DOCUMENTS 4,221,543 A * 9/1980 Cosentino et al. .............. 417/22
8,299,730 B2 * 10/2012 Gaknoki et al. .............. 315/307

FOREIGN PATENT DOCUMENTS

| JP | 2007-227155 | | 9/2007 |
| JP | 2007227155 A | * | 9/2007 |
| JP | 2009-158173 | | 7/2009 |
| WO | WO 2010137002 A1 | * | 12/2010 |

OTHER PUBLICATIONS

U.S. Final Office Action dated Feb. 12, 2014, issued in related U.S. Appl. No. 13/435,779.

* cited by examiner

*Primary Examiner* — Douglas W Owens
*Assistant Examiner* — Monica C King
(74) *Attorney, Agent, or Firm* — Holtz, Holtz, Goodman & Chick PC

(57) ABSTRACT

A lighting power supply device receives a voltage converted from an alternating current to a direct current by a rectifying circuit rectifying the alternating current whose phase is controlled by a phase control type dimmer, and generates and outputs a direct current voltage/current to be supplied to a load. The lighting power supply device includes: a control circuit, and the control circuit gradually decreases a current drawn from the rectifying circuit from a predetermined current value set in advance, determines a current value immediately before detecting a malfunction of the phase control type dimmer as a drawn current value, and performs current control so as to maintain the determined current value.

10 Claims, 10 Drawing Sheets

LIGHTING POWER SUPPLY DEVICE AND METHOD FOR CONTROLLING HOLDING CURRENT

BACKGROUND OF THE INVENTION

1. Field of the Invention

The present invention relates to a lighting power supply device for performing dimming with a phase control type dimmer, and more particularly relates to a power supply device capable of controlling dimming of a lighting apparatus using a light emitting diode (LED) and a method for determining a holding current.

2. Description of Related Art

In recent years, a lighting device (hereinafter referred to as an LED lamp) using an LED consuming less electric power instead of an incandescent lamp consuming much electric power has been widely spread in order to reduce an amount of carbon dioxide emission. In the past, Japanese Patent Application Laid-Open Publication No. 2007-227155 has suggested a technique for controlling dimming with a phase control type dimmer in a power supply device for an LED lamp. Meanwhile, a dimming control has been performed with a phase control type dimmer also in a power supply device for an incandescent lamp.

As described in Japanese Patent Application Laid-Open Publication No. 2007-227155, the power supply device for the LED lamp equipped with the phase control type dimmer includes: a phase control type dimmer having a thyristor or a triac serving as a switching element and a control section for controlling ON/OFF of the switching element; a rectifying circuit for converting an alternating current into a direct current; and a lighting power supply circuit having an AC-DC converter for supplying a desired electric power to an LED lamp. In the phase control type dimmer, the control section controls an ON phase angle of the switching element in accordance with a resistance value of a variable resistance serving as a dimmer adjusting member to change a duty ratio of an alternating-current power-supply voltage input from a commercial alternating-current power supply, whereby the LED connected to the lighting power supply circuit is controlled.

The thyristor or triac used as the switching element in the phase control type dimmer is different from a switching element such as a transistor in that the thyristor or triac malfunctions when a current flowing therethrough is completely shut off, and therefore, it is desirable to make the minimum electric current (holding current) constantly flow at which the ON state can be maintained. Meanwhile, in the power supply device for the incandescent lamp equipped with the phase control type dimmer, an incandescent light bulb behaves like a low resistance load, and therefore, a current equal to or more than the holding current of the thyristor or triac flows in the phase control dimmer. In this case, even when dimmer is reduced, the phase control dimmer can operate normally.

On the other hand, in the power supply device for the LED lamp equipped with the phase control type dimmer, the LED lamp behaves like an inductive load, and therefore, when dimming is reduced, a current equal to or more than the holding current of the thyristor or triac does not flow, which may cause the phase control dimmer to malfunction. Moreover, depending on the type of the thyristor or triac, a magnitude of the holding current thereof is different. The holding currents of phase control dimmers currently available in the market vary from several milliamperes to several hundred milliamperes. For this reason, when a power supply device is designed to support all such phase control dimmers, current is wasted in a system using a dimmer which can operate with a holding current of several milliamperes, and there is a problem in that the electric power efficiency decreases.

In the past, Japanese Patent Application Laid-Open Publication No. 2009-158173 has suggested an invention of a dimming device for a lighting whose load varies greatly, wherein a main power supply switch device (e.g., thyristor) used for driving a large load and a sub-power supply switch device used for driving a small load and consuming less holding current are provided in parallel, and phase control is performed by using the main power supply switch device when a heavy load is applied, and by using the sub-power supply switch device when a light load is applied. However, the invention disclosed in Japanese Patent Application Laid-Open Publication No. 2009-158173 requires two power supply switch devices, i.e., the main power supply switch device and the sub-power supply switch device, and there is a problem in that the number of component parts increases, which makes it difficult to reduce the size of the dimmer.

SUMMARY OF THE INVENTION

The present invention is made in view of the above problems, and it is an object of the present invention to make a holding current suitable for a switching element of a phase control type dimmer flow in a lighting power supply device constituting a lighting system equipped with the phase control type dimmer, thus avoiding occurrence of malfunction without making any wasteful current flow.

Another object of the present invention is to enhance an electric power efficiency of the lighting power supply device constituting the lighting system equipped with the phase control type dimmer.

In order to achieve the above object, according to a first aspect of the present invention, there is provided a lighting power supply device which receives a voltage converted from an alternating current to a direct current by a rectifying circuit rectifying the alternating current whose phase is controlled by a phase control type dimmer, and generates and outputs a direct current voltage/current to be supplied to a load, the lighting power supply device including: a control circuit, wherein the control circuit gradually decreases a current drawn from the rectifying circuit from a predetermined current value set in advance, determines a current value immediately before detecting a malfunction of the phase control type dimmer as a drawn current value, and performs current control so as to maintain the determined current value.

According to a second aspect of the present invention, there is provided a method for controlling a holding current for a lighting power supply device, which device includes a switching element for intermittently flowing a current through an inductor connected in series with a lighting device serving as a load; and a control circuit for driving the switching element, and which device receives a voltage converted from an alternating current to a direct current by a rectifying circuit rectifying the alternating current whose phase is controlled by a phase control type dimmer to generate and output a direct current voltage/current supplied to the load, the method including the step of: controlling the holding current by the control circuit, wherein the control circuit gradually decreases the current drawn from the rectifying circuit from the predetermined current value set in advance while determining whether a phenomenon caused by malfunction of the phase control type dimmer occurs by monitoring the voltage converted by the rectifying circuit or the voltage proportional to the voltage converted by the rectifying circuit, and determines, as a holding current value, the current value immediately before detecting the phenomenon caused by malfunction of the phase control type dimmer so that the control circuit controls the current to be drawn.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein.

DETAILED DESCRIPTION OF THE INVENTION

Hereinafter, a preferred embodiment of the present invention will be described below with reference to the accompanying drawings.

Figure 1:
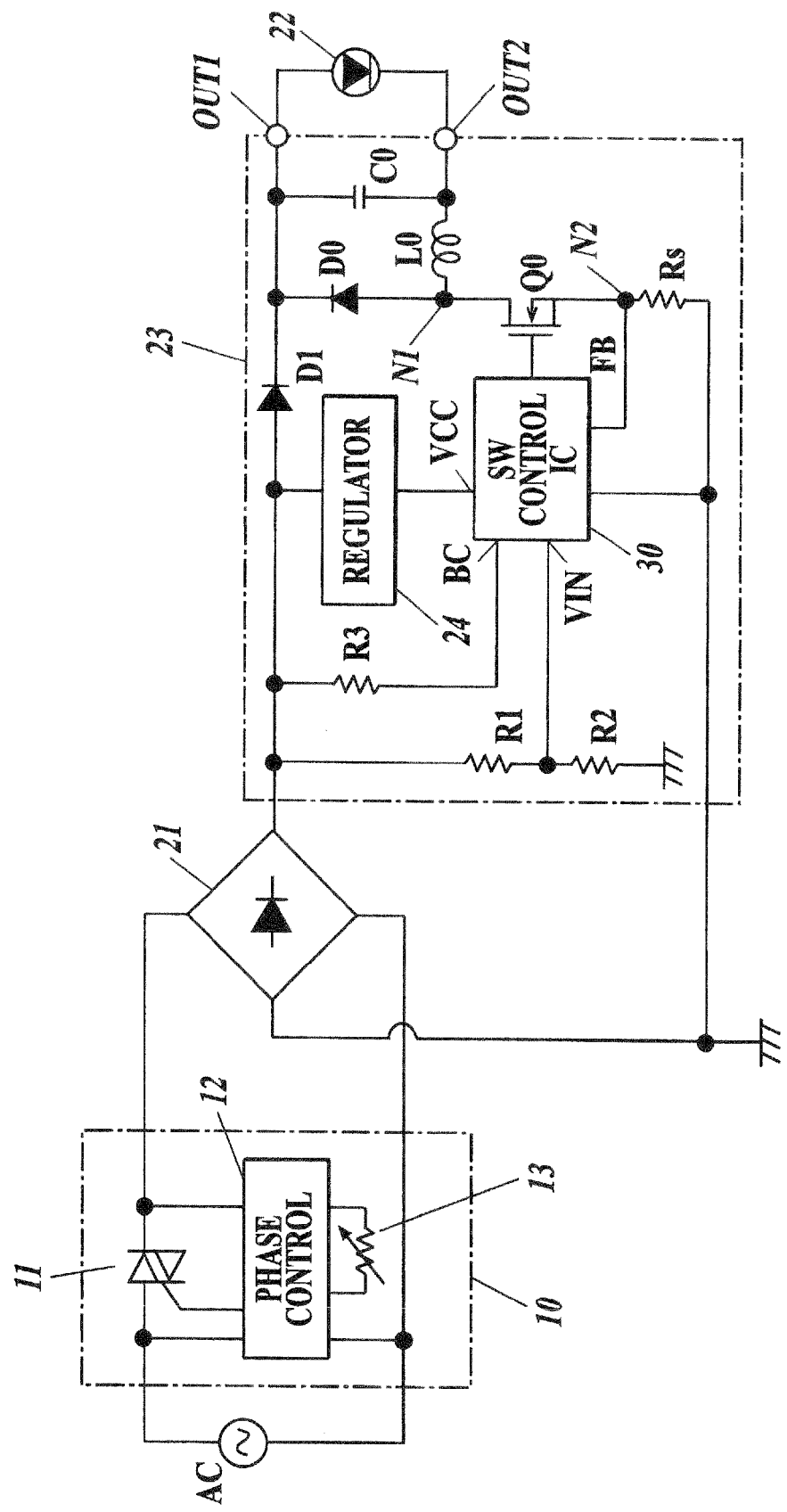
FIG. 1 is a block diagram showing a schematic configuration of a phase control type LED power supply device and an LED lighting system using the phase control type LED power supply device to which the present invention can be effectively applied.

FIG. 1 shows a schematic configuration of a phase control type LED power supply device and an LED lighting system using the phase control type LED power supply device to which the present invention can be effectively applied.

As shown in FIG. 1, a phase control type LED lighting system according to the present embodiment includes: e.g., a phase control type dimmer 10 which receives an alternating-current power-supply voltage AC from a commercial alternating-current power supply and controls an ON phase angle of a switching element to change a duty ratio of the alternating-current power-supply voltage to output the alternating-current power-supply voltage; a rectifying circuit 21 which is composed of a diode bridge and the like and converts the input alternating current into a direct current through full-wave rectification; an LED power supply circuit 23 which is composed of an AC-DC converter (direct current voltage conversion circuit) and supplies desired electric power to an LED lamp 22 serving as a load on the basis of the direct current voltage/current converted by the rectifying circuit 21; and a regulator 24 which generates a power-supply voltage required for an operation of a control circuit (30) of the LED power supply circuit 23.

More accurately, in FIG. 1, a portion of a circuit enclosed by an alternate long and short dash line excluding the LED lamp 22 is the power supply circuit (AC-DC converter). The AC-DC converter is not limited to the configuration as shown in FIG. 1. As long as an alternating current voltage can be converted into a direct current voltage, an AC-DC converter having other configurations may also be used.

The phase control type dimmer 10 includes a switching element 11 such as a thyristor (diac) or a triac, a control section 12 which controls ON/OFF of the switching element 11 through phase control, and a dimmer adjusting member 13 which is composed of a variable resistance and the like. The control section 12 controls the ON phase angle of the switching element 11 in accordance with a state, e.g., a resistance value of the dimmer adjusting member 13, thereby changing the duty ratio of the alternating-current power-supply voltage and outputting the alternating-current power-supply voltage. In the LED lighting system of FIG. 1, a capacitance C0 connected between output terminals OUT1-OUT2 between which the LED lamp 22 is connected is a capacitor which suppresses fluctuation in the voltage between the output terminals. A smoothing capacitor may be connected between the output terminal OUT1 and a grounding point so as to stabilize a voltage of the output terminal OUT1 (cathode voltage of a diode D1).

The LED power supply circuit 23 according to the present embodiment includes an inductor L0, a switching transistor Q0, and a current detecting sense resistance Rs, which are connected in series between the output terminal OUT2 and the grounding point, to which the LED lamp 22 is connected, a rectifying diode D0 connected between the output terminal OUT1 and a connection node N1 between the inductor L0 and the switching transistor Q0, and a switching control semiconductor integrated circuit (control IC) 30 for controlling ON/OFF of the switching transistor Q0. That is, the LED power supply circuit 23 is made as a so-called switching regulator.

The potential at the connection node N2 which is converted from current to voltage with the sense resistance Rs is input to the control IC 30 as a feedback voltage FB. The control IC 30 includes an error amplifier which compares the feedback voltage FB with the reference voltage to output a voltage according to the potential difference, and is configured to output a signal for controlling ON/OFF of the switching transistor Q0 in accordance with the output voltage provided by the error amplifier to control the current flowing through the sense resistance Rs so that the current maintains a constant level.

The LED power supply circuit 23 also includes resistances R1, R2 connected in series for dividing the rectified voltage. The voltage divided by the resistances R1, R2 is input to the input terminal VIN of the control IC 30 as a monitoring voltage Vin. The control IC 30 has a power supply terminal VCC from which the voltage generated by the regulator 24 is provided, and a current drawing terminal BC which is connected to the output terminal of the rectifying circuit 21 via the resistance R3 and draws the holding current of the switching element 11 in the dimmer. The current-drawing function of the control IC 30 will be explained later in detail.

When the potential at the connection node N2 between the transistor Q0 and the sense resistance Rs drops, the control IC 30 outputs a control signal for turning on the transistor Q0 to a gate terminal of the transistor Q0. This causes a current to flow through Q0 to the grounding point. Since the rectifying diode D0 is connected in a reverse direction, the current flowing from the rectifying circuit 21 to the LED power supply circuit 23 flows through the LED lamp 22, the inductor L0, the transistor Q0, and the resistance Rs to the grounding point. At this occasion, this current causes the LED lamp 22 to illuminate, during which time the inductor L0 accumulates energy.

When the current flows through the sense resistance Rs, the potential at the connection node N2 increases. When the control IC 30 compares the potential at the node N2 with the internal reference voltage and determines that the potential at the node N2 is higher than the reference voltage, the control IC 30 outputs a control signal for turning OFF the transistor Q0 to a gate terminal of the transistor Q0. When Q0 is turned off, the energy accumulated in the inductor L0 is discharged, and a current flows to the output terminal OUT1 from the inductor L0 through the diode D0, so that the current causes LED lamp 22 to illuminate. By repeating the above operation, the LED lamp 22 continuously illuminates. In addition, the brightness of the LED lamp 22 is adjusted when the dimmer 10 controls the phase of the alternating input. The switching frequency of the transistor Q0 controlled by the control IC 30 is set at a frequency higher than the frequency of the alternating-current input voltage AC.

Figure 2:
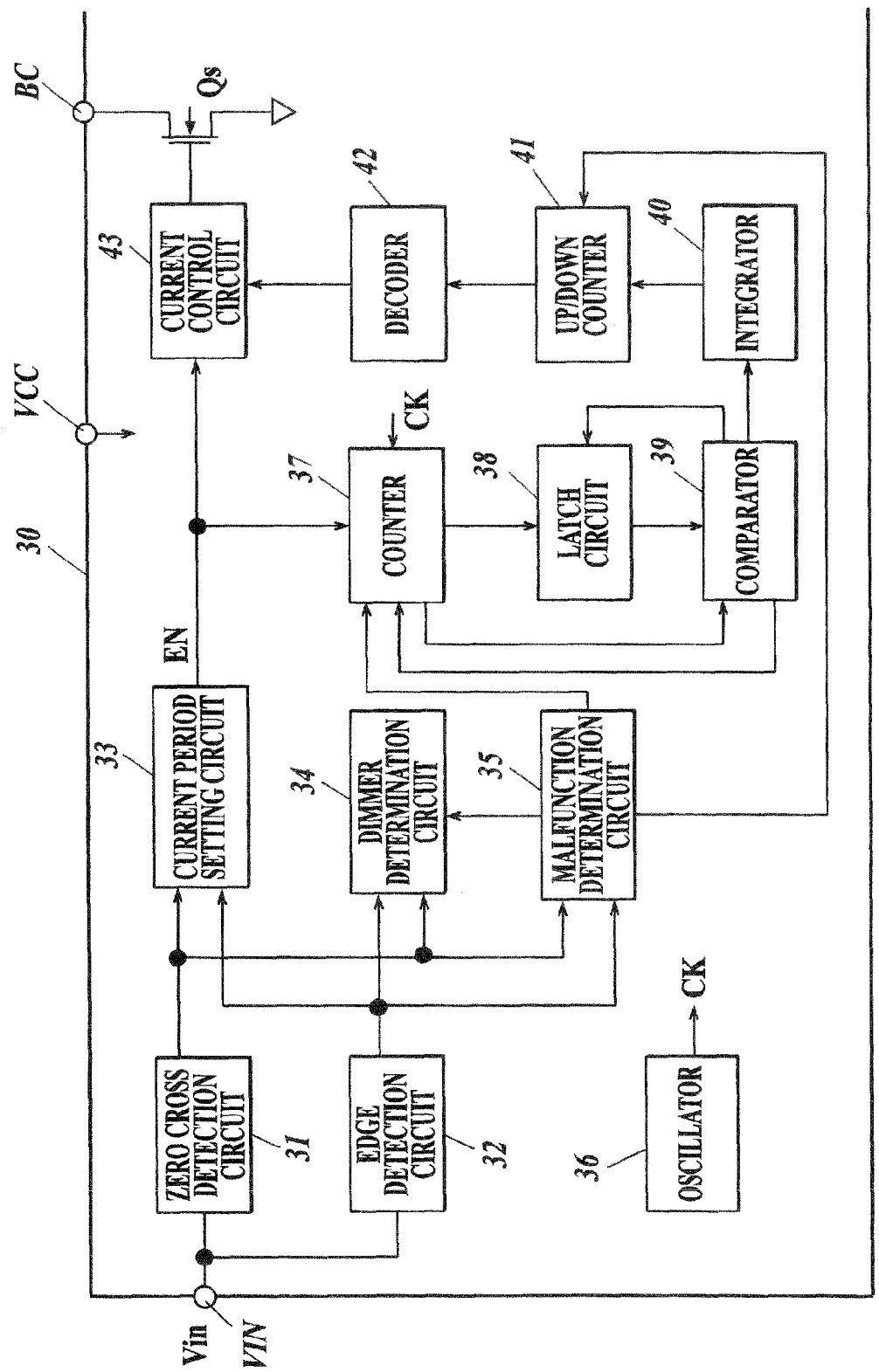
FIG. 2 is a block diagram showing a schematic configuration of holding current optimization of a control integrated circuit (IC) in the LED power supply device constituting the lighting system according to the embodiment.

FIG. 2 shows an example of the control IC 30 constituting the LED power supply circuit 23. As shown in FIG. 2, the control IC 30 according to the example includes: a zero cross detection circuit 31 which is connected to an input terminal VIN where the voltage Vin divided by the resistances R1, R2 is applied and detects a timing at which the rectified voltage becomes 0 V; an edge detection circuit 32 which detects a timing (rise or fall) at which the rectified voltage rapidly changes; a current period setting circuit 33 which determines a period in which a current flows on the basis of signals provided by the zero cross detection circuit 31 and the edge detection circuit 32 to output a corresponding signal EN; and a dimmer determination circuit 34 which determines the state of the dimmer 10.

The dimmer determination circuit 34 detects a dimming unused state in which dimming is not controlled, i.e., a state in which the LED illuminates but dimming is not reduced. The dimmer determination circuit 34 may determine the dimming unused state when the zero cross detection circuit 31 detects a zero timing of Vin but the edge detection circuit 32 does not detect any edge of Vin. When the dimmer determination circuit 34 detects the dimming unused state, a detection signal is output to the current period setting circuit 33 so that an operation of the current period setting circuit 33 is stopped or an output from the current period setting circuit 33 is shut off.

The control IC 30 includes: a malfunction determination circuit 35 which determines a malfunction of the dimmer 10 on the basis of signals provided by the zero cross detection circuit 31 and the edge detection circuit 32; an oscillator 36 which generates a clock signal CK of a frequency sufficiently higher than the frequency of the alternating-current power-supply voltage AC; and a counter 37 which counts the clock signal CK provided by the oscillator 36. The malfunction determination circuit 35 may determine the malfunction of the dimmer when the zero cross detection circuit 31 does not detect the zero timing of Vin while the edge detection circuit 32 detects edges of Vin twice.

The control IC 30 further includes: a latch circuit 38 which is composed of a resistor for latching a value counted by the counter 37; a comparator 39 which compares the value currently counted by the counter 37 and the value held in the latch circuit 38 to determine whether the value currently counted by the counter 37 matches the value held in the latch circuit 38; an integrator (frequency divider counter) 40 which counts an output pulse of the comparator 39; an up/down counter 41 which down-counts a value in response to a signal provided by the integrator 40 and up-counts the value in response to the signal provided by the malfunction determination circuit 35; and a decoder 42 which decodes the value counted by the counter 41. The up/down counter 41 is configured to have a value at which the current of the maximum holding current value determined in advance flows in the initial state.

The control IC 30 also includes a current-sinking MOS transistor Qs which is connected between the current drawing terminal BC and the grounding point, and a current control circuit 43 which controls a drain current of the transistor Qs. The current control circuit 43 generates a gate voltage of the transistor Qs in accordance with the output of the decoder 42 to control the drawn current. The current control circuit 43 can be composed of a DA conversion circuit. The comparator 39 can be composed of a subtractor.

Figure 3:
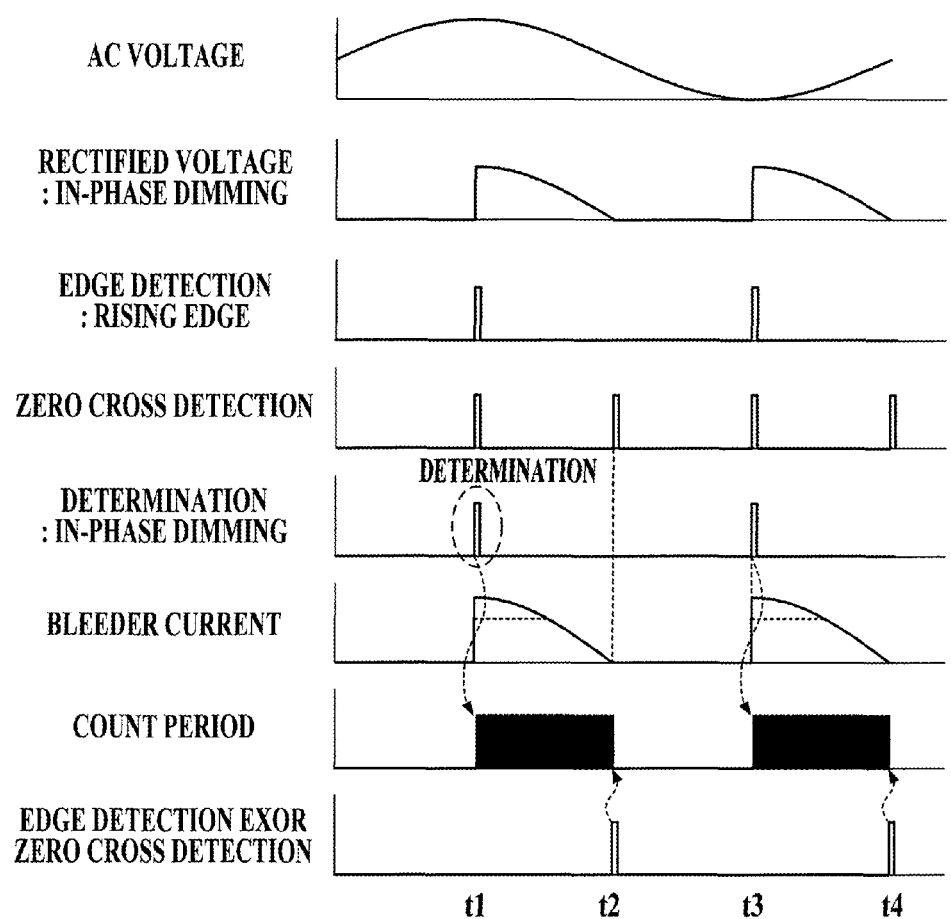
FIG. 3 is a timing chart showing changes of signals and voltages in respective portions when a phase control is performed by the dimmer in the lighting system according to the embodiment and the system is operating normally with a current equal to or more than a holding current flowing through a switching element such as a thyristor.
Figure 4:
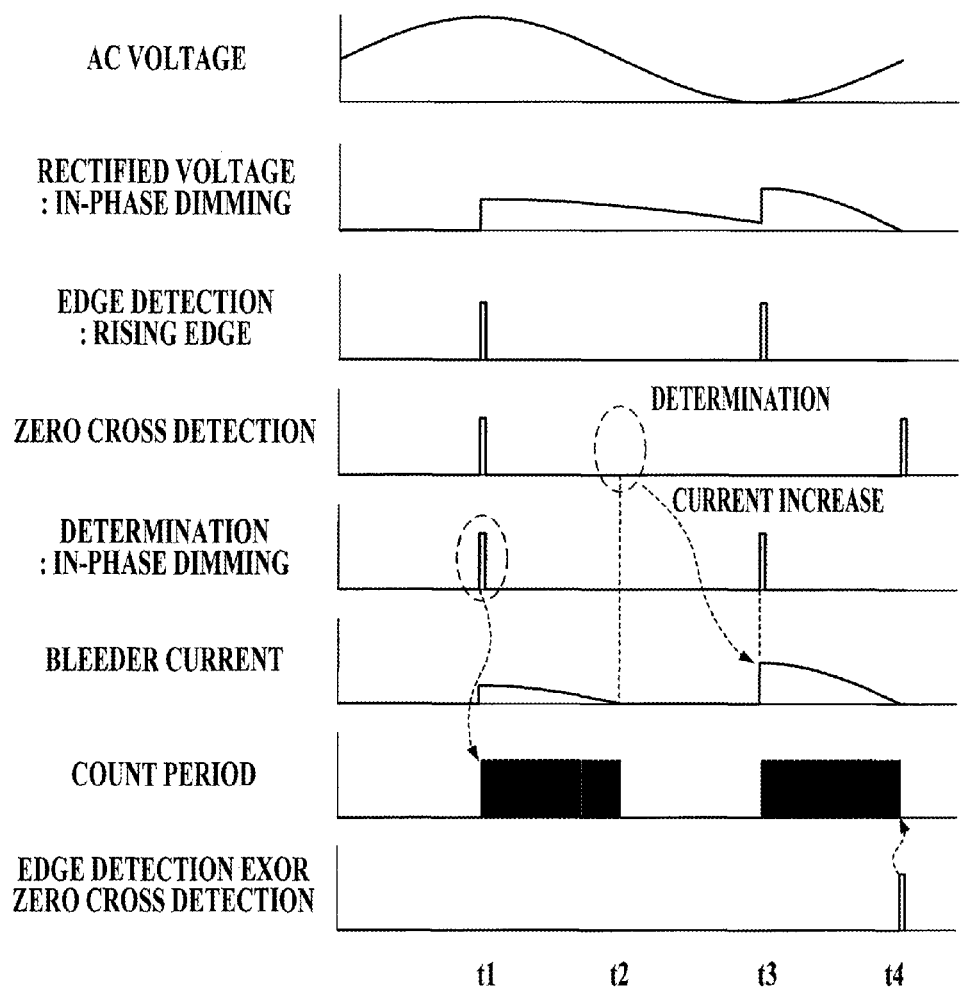
FIG. 4 is a timing chart showing changes of signals and voltages in respective portions when dimming by the dimmer of the lighting system according to the embodiment is reduced and the system is in malfunctioning state in which a current equal to or less than the holding current flows through the switching element.

Subsequently, a current-drawing operation by the control IC 30 will be explained with reference to FIGS. 3 to 7. FIG. 3 shows changes of signals and voltages in respective portions when the phase control is performed by the dimmer 10 and the system is operating normally with a current equal to or more than the holding current flowing through the switching element 11 such as a thyristor. FIG. 4 shows changes of signals and voltages in respective portions when dimming by the dimmer 10 is reduced and the system is in malfunctioning state in which a current equal to or less than the holding current flows through the switching element 11. In FIGS. 3 to 7, a waveform shown as a bleeder current is a current drawn by the control IC 30. The control IC 30 has a function of adjusting this current.

As shown in FIG. 3, when the dimmer 10 is operating normally in the control IC 30 according to the example, the edge detection circuit 32 detects a rising edge of the input voltage Vin as shown in the third stage ("EDGE DETECTION: RISING EDGE") of FIG. 3, and outputs an edge detection pulse. When the dimmer 10 is operating normally, the zero cross detection circuit 31 detects a timing at which the input voltage Vin becomes 0 V, and outputs a zero cross detection pulse as shown in the fourth stage ("ZERO CROSS DETECTION") of FIG. 3.

When pulses as shown in the third and fourth stages ("EDGE DETECTION: RISING EDGE" and "ZERO CROSS DETECTION") of FIG. 3 are output, the dimmer determination circuit 34 determines that in-phase dimming is performed, and causes the current period setting circuit 33 to operate. Accordingly, the current period setting circuit 33 outputs a signal EN changing to a high level at an output time t1 at which the edge detection pulse is output and representing a period in which a current flows. Then, the counter circuit 37 starts counting the clock signal CK provided by the oscillator 36 using the signal EN representing this period as an enable signal. Then, at a time t2 at which there is no edge detection pulse and only the zero cross detection pulse is output, the counter circuit 37 stops counting the clock in accordance with the change of the signal output from the current period setting circuit 33, and the count value at that occasion is latched in the latch circuit 38.

The counter 37 is reset when the count value of the counter circuit 37 is latched in the latch circuit 38, and at an output time t3 at which a subsequent edge detection pulse is output, the counter circuit 37 starts counting the clock signal CK from zero again. Then, at a time t4 at which there is no edge detection pulse and only the zero cross detection pulse is output, the counter circuit 37 stops counting the clock, and the comparator 39 compares the count value at that occasion with the count value which is already latched in the latch circuit 38 at the time t2.

Figure 5:
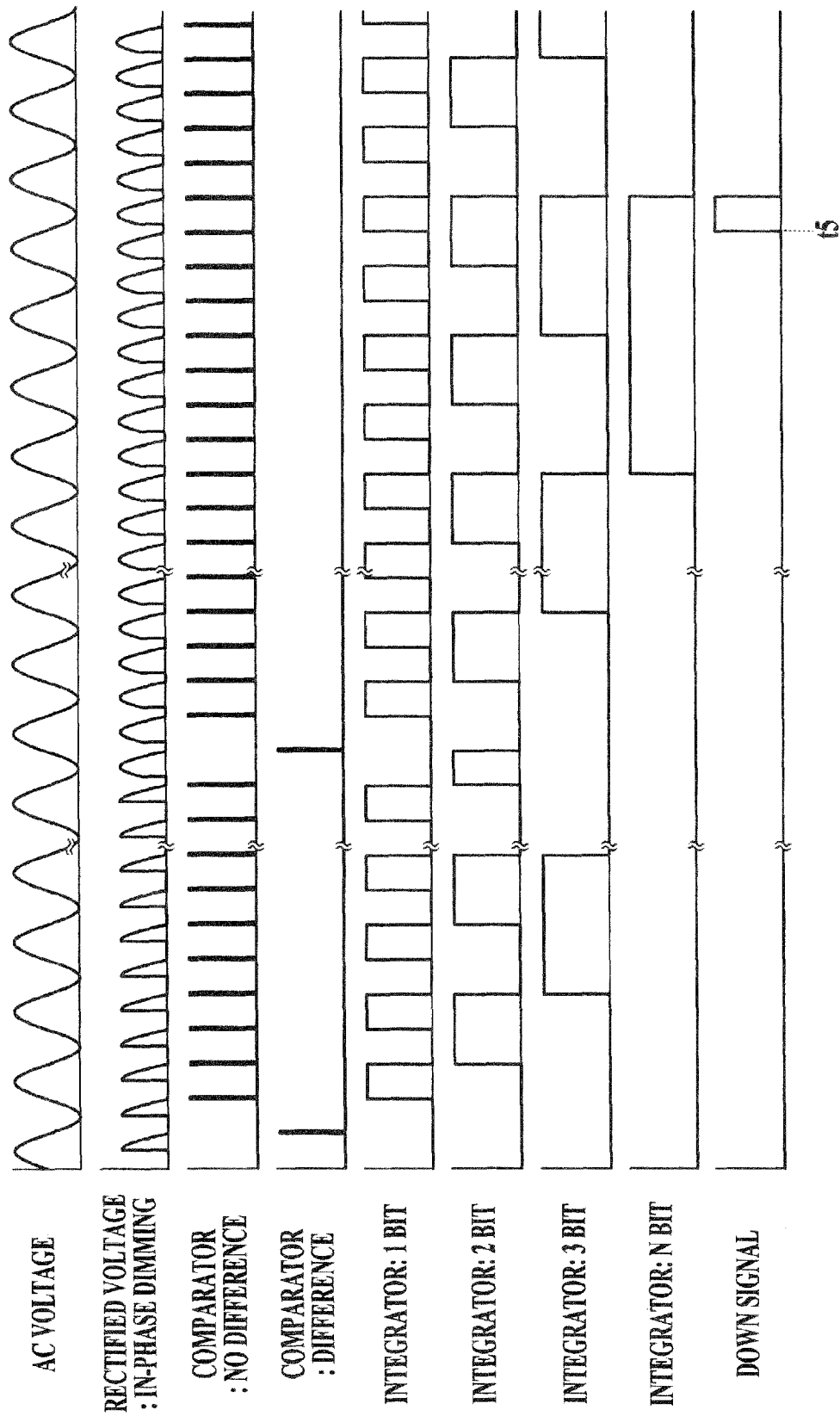
FIG. 5 is a timing chart showing operations of a comparator and an integrator (frequency divider counter) in the control IC according to an example.
Figure 6:
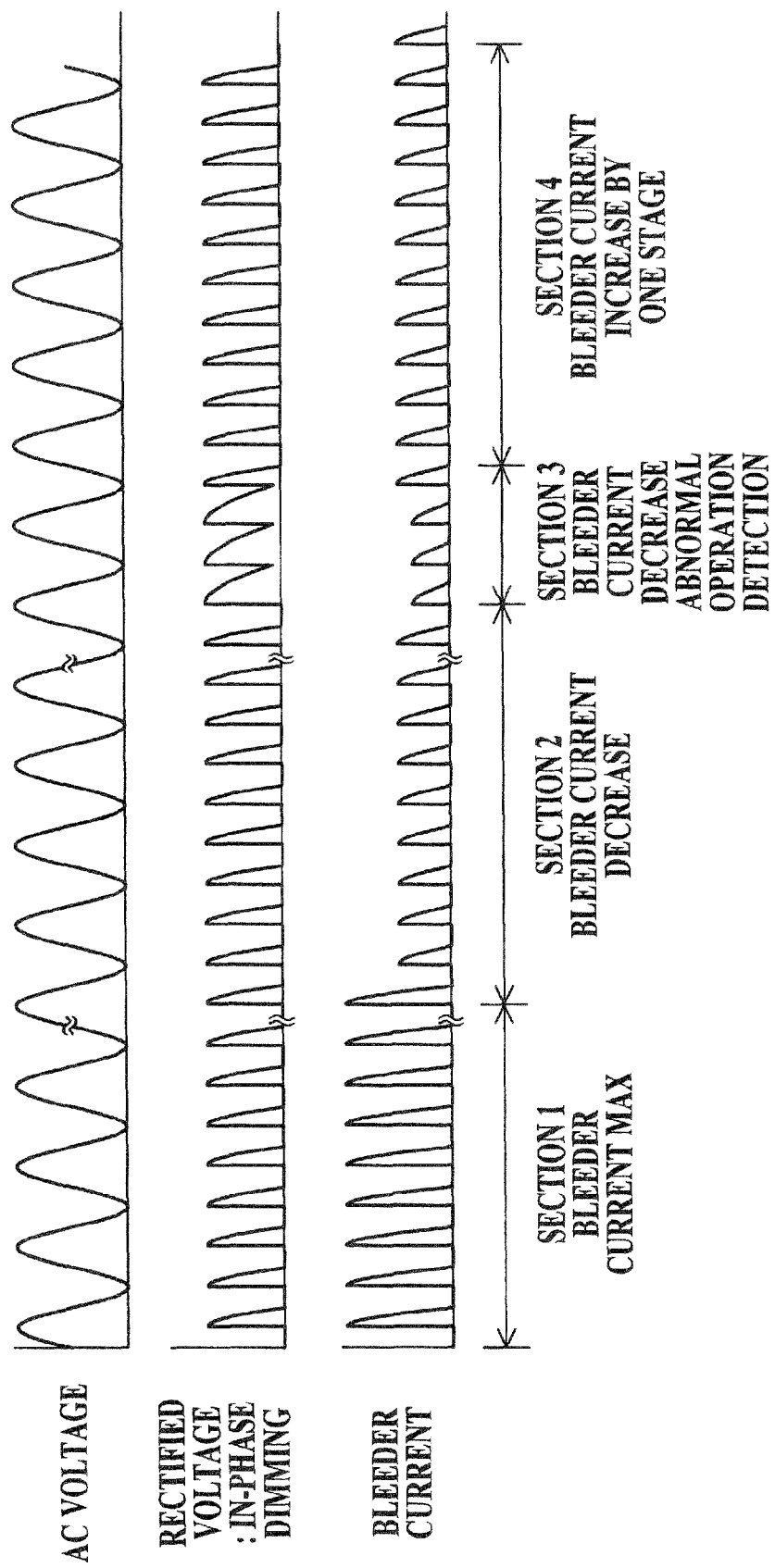
FIG. 6 is a timing chart showing a change of a bleeder current (drawn current) after the control IC according to the example is activated.
Figure 7:
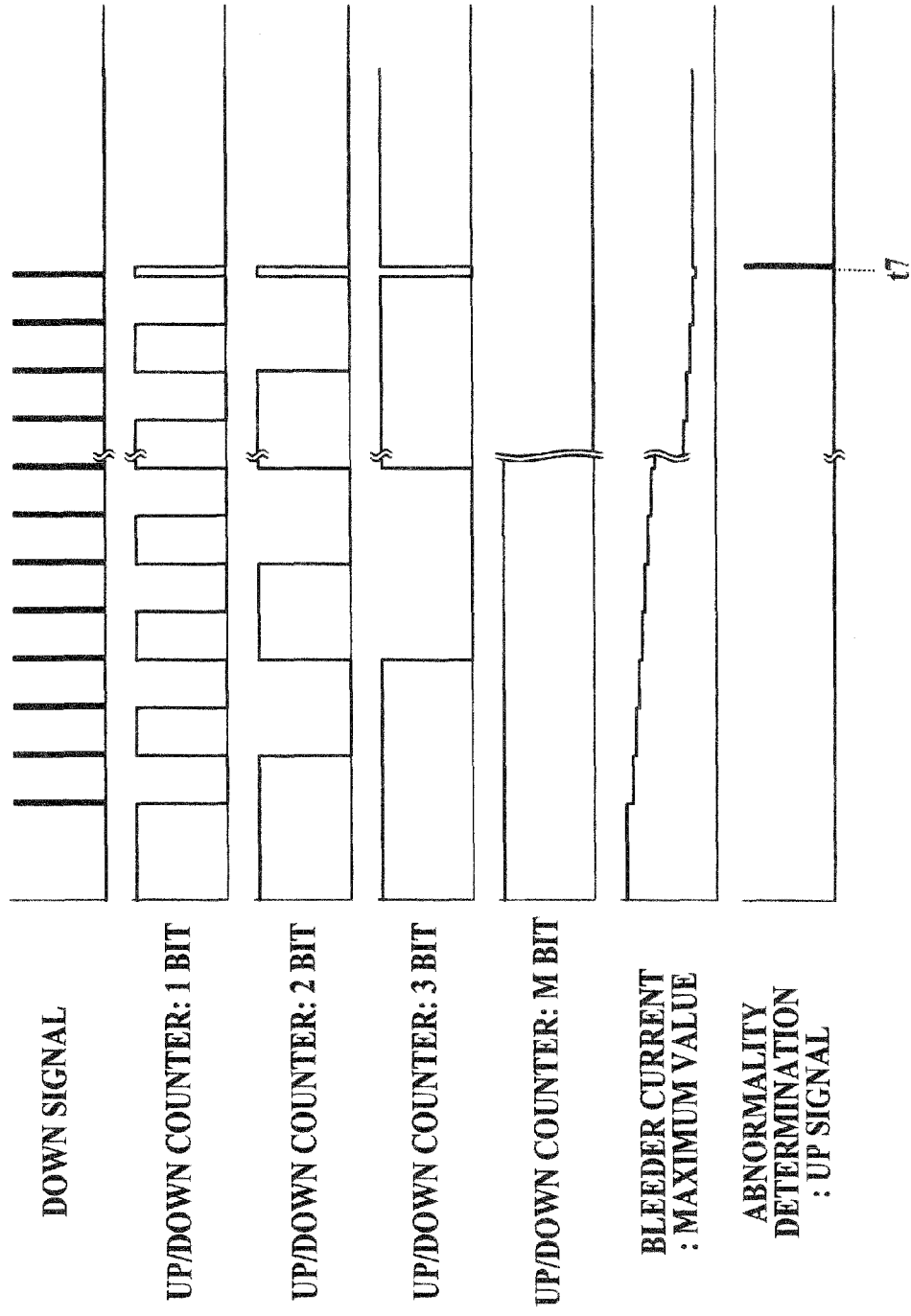
FIG. 7 is a timing chart showing operations of an up/down counter and a change of the maximum value of the bleeder current (drawn current) after the control IC according to the example is activated.

When a result of the comparison indicates that the two count values match each other, a count-up pulse is output to the frequency divider counter 40 to cause the frequency divider counter 40 to count-up the value (see the timing chart of FIG. 5). When the comparator 39 does not determine that the two count values match each other, a reset signal is output to the frequency divider counter 40, and a signal for re-latching the value of the counter circuit 37 at that occasion is output to the latch circuit 38. As a result, while the count values of the counter circuit 37 are determined to be the same, the latch circuit 38 holds the previous value without performing the latch operation, and when the count values are determined to be different, the value thereof is latched. Alternatively, the value may be latched every time the comparator 39 completes the comparison operation.

When the result of the comparison provided by the comparator 39 indicates that the values match each other as described above, i.e., when dimmer adjustment of the dimmer 10 is not changed, the frequency divider counter 40 count-ups the value every time the comparison operation is performed, and when the value reaches a predetermined number N (e.g., 16), the frequency divider counter 40 outputs a pulse to the up/down counter 41. Since this pulse is supplied as a signal for commanding down-count to the up/down counter 41, the up/down counter 41 performs down-counting operation (−1) every time the up/down counter 41 receives a pulse from the frequency divider counter 40. When the up/down counter 41 receives the malfunction detection pulse from the malfunction determination circuit 35 as described above, the counter 41 count up the value (+1).

Meanwhile, when the dimmer 10 malfunctions and the input voltage Vin does not sufficiently decrease to 0 V, no zero cross detection pulse is output, as shown in the fourth stage ("ZERO CROSS DETECTION") of FIG. 4, at the time t2 at which the zero cross detection pulse is expected to be output in normal operation. As a result, the malfunction determination circuit 35 detects this to output a pulse, and this causes the counter circuit 37 to stop counting the clock. The detection pulse output from the malfunction determination circuit 35 is also supplied to the up/down counter 41 to cause the counter 41 to count up the value (+1).

In short, in the control IC 30 according to the example, the maximum value is set in the up/down counter 41 in the initial state, and immediately after the control starts, the maximum drawn current flows through the sinking transistor Qs. Then, while the count values of the counter circuit 37 are the same, i.e., the dimmer adjusting operation does not change, the up/down counter 41 down-counts the value on every comparison operation so that the drawn current (bleeder current) caused to flow by the transistor Qs gradually decreases (see the timing chart of FIG. 6). As a result, the dimmer 10 malfunctions when the drawn current becomes equal to or less than the holding current, and the malfunction determination circuit 35 detects the malfunction of the dimmer 10. Accordingly, the malfunction determination circuit 35 supplies the malfunction detection pulse to the up/down counter 41, whereby the counter 41 counts up the value (+1) (see the timing chart of FIG. 7). Then, the series of drawn current adjusting operations as described above is terminated. Therefore, the control can be performed so as to attain a state in which the holding current suitable for the used switching element of the dimmer is drawn.

When the dimmer 10 is adjusted to a level at which a sufficient current equal to or more than the holding current flows through the switching element (i.e., the LED illuminates with full power without any phase control), it is unlikely that the rectified voltage (input voltage Vin of the IC 30) does not drop to 0 V as shown in the second stage ("RECTIFIED VOLTAGE: IN-PHASE DIMMING") of FIG. 4. In other words, when the LED illuminates with full power, the dimmer does not malfunction even if the drawn current is gradually decreased. For this reason, the control is performed such that the up/down counter 41 continuously down-counts the value, and when the count value becomes zero, the drawn current caused to flow by the transistor Qs also becomes zero.

In the above explanation, the dimmer 10 controls the front edge (rising edge) of the phase of the alternating waveform. However, the control circuit 30 of FIG. 2 can also perform optimization of the drawn current based on the same principle even when the dimmer 10 controls the rear edge (falling edge) of the phase of the alternating waveform. When controlling the rear edge of the phase, the counter 37 may start counting in response to the zero cross detection pulse and may stop counting in response to the edge detection pulse. A determination as to whether the rear edge of the phase is controlled can be made by causing the dimmer determination circuit 34 to determine whether which of the zero cross detection pulse and the edge detection pulse is received first.

Further, even after the suitable holding current is once set in the circuit as shown in FIG. 2 for performing the drawn current adjusting control, when the LED current changes, i.e., when the phase (edge) of the input voltage Vin changes, due to the dimmer adjustment by the dimmer adjusting member 13 in the dimmer 10, the value counted by the counter 37 in response to the change is changed, whereby the up/down counter 41 counts up or down the value, and the drawn current is controlled in accordance with the adjusted LED current. Then, when the drawn current control is continuously performed in this manner, the up/down counter 41 repeats increasing and decreasing the value even if the dimmer adjustment is not performed, so that a substantially constant drawn current flows.

During the above current control, the up/down counter 41 repeats up-counting and down-counting the value. This up-counting/down-counting operation is performed several times per second when the count value N of the frequency divider counter 40 is 16, for example. The LED current slightly fluctuates on every up-counting/down-counting operation. At this occasion, when the up/down counter 41 simply repeats up-counting of the value of +1 and down-counting of the value of −1, or when the LED current is sufficiently large, the change amount of the current is small, which cannot be perceived by human eyes. However, in some cases, the up/down counter 41 counts up or down the value by two or more (+2) or by two or less (−2) in a short time due to fluctuation of the alternating-current input voltage AC, characteristics of the used device, or the like. If it is assumed that the LED current changes by about 1 mA in the above case for example, when the adjusted current of the LED is sufficiently large at that occasion, the amount of relative change is small, which does not cause any problem. However, when the adjusted current of the LED is relatively small, e.g., 10 mA, there is a problem in that the brightness changes by about 10% in response to change of 1 mA with respect to 10 mA, which may be perceived by human eyes as variation in light intensity (brightness).

For this issue, the control IC 30 according to the example continues or stops executed current control in accordance with the magnitude and change amount of the current flowing through the LED lamp 23 serving as the load. When the current control is stopped, the drawn current immediately before the stop is maintained. Therefore, the variation in light intensity (brightness) caused by the current control can be prevented. In this case, a determination as to whether the executed current control is continued or stopped can be made by, e.g., monitoring the output of the up/down counter 41 or the output of the decoder 42 and determining whether the output has changed by a predetermined amount or more. The current control can be easily stopped by, e.g., stopping operation of the circuits 31 to 40 or stopping operation of the malfunction determination circuit 35 and the integrator 40. However, the method for stopping the current control is not limited to the above methods.

In the above explanation, for example, the current control is stopped when the current of the LED changes by 10%. However, 10% is merely an example. The change amount in the LED current that can be perceived by human eyes is different according to the applied system, e.g., characteristics of the used LED lamp 23, the LED current value at that occasion, and the resolution of the up/down counter 41, i.e., the change amount in the drawn current value when the value of the up/down counter 41 changes by "1". Therefore, the percentage of the change in the current of the LED at which the current control is stopped may be set in accordance with the LED current value and the system as necessary.

Figure 8:
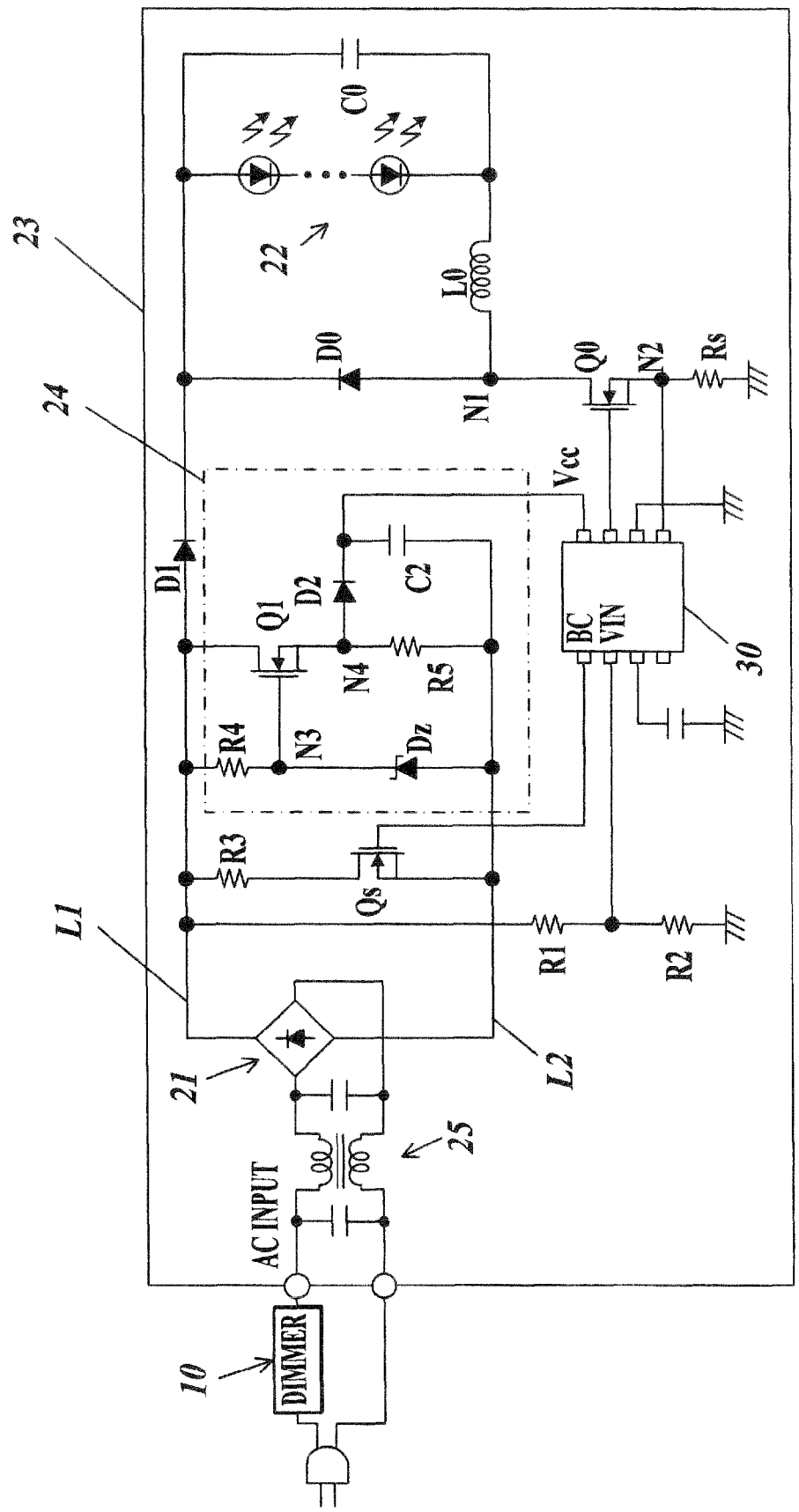
FIG. 8 is a circuit configuration diagram showing a first modification of an LED power supply device according to the example.

FIG. 8 shows a first modification of the LED power supply circuit 23 of FIG. 1.

An LED power supply circuit 23 according to the modification is provided by arranging the on-chip sinking transistor Qs shown in FIG. 2 as an external device attached to the outside of the control IC 30, and the LED power supply circuit 23 according to the modification is the same as what is shown in FIG. 1 in terms of operation. A filter 25 for cutting off noise such as a common mode coil is provided between a dimmer 10 and a rectifying circuit 21. Further, FIG. 8 specifically shows an example of a circuit of a regulator 24 generating a power-supply voltage Vcc for the control IC 30.

As shown in FIG. 8, the regulator 24 includes: e.g., a constant voltage circuit which is composed of a resistance R4 and a Zener diode Dz connected in series between a power supply line L1 and a ground line L2; a MOS transistor Q1 and a resistance R5 which are connected in series between the power supply line L1 and the ground line L2; a reverse current prevention diode D2 which is connected in a forward direction between a power supply terminal VCC of the control IC 30 and a connection node N4 between the MOS transistor Q1 and a resistance R5; and a capacitor C2 which is connected between the ground line L2 and a cathode terminal of a diode D2. The gate terminal of the MOS transistor Q1 is connected to a connection node N3 between the resistance R4 and the Zener diode Dz. When the Zener voltage is applied to the gate terminal, the MOS transistor Q1 can operate as a constant voltage source.

In the regulator 24 according to this example, when the voltage (pulsating current) full-wave rectified by the rectifying circuit 21 attains a voltage equal to or more than the Zener voltage of Dz, a current flows through the resistance R4 and the Zener diode Dz, and the constant voltage is applied to the gate terminal of the MOS transistor Q1, whereby the MOS transistor Q1 attains ON state, and the current flows to the capacitor C2 via the diode D2. Thereafter, when the full-wave rectified voltage (pulsating current) attains a voltage equal to or less than the Zener voltage of Dz, the MOS transistor Q1 turns off, and the potential at the node N4 decreases, but the capacitor C2 is prevented from discharging by the reverse current prevention diode D2.

By repeating the above operation, the capacitor C2 is charged with electrical charge and the smoothed voltage is generated, which is supplied to the power supply terminal VCC of the control IC 30 as the power-supply voltage Vcc. The regulator 24 is not limited to the above configuration. Instead of arranging the regulator 24, a separate battery or an auxiliary power supply may be provided, so that the power-supply voltage Vcc of the control IC 30 is supplied.

Figure 9:
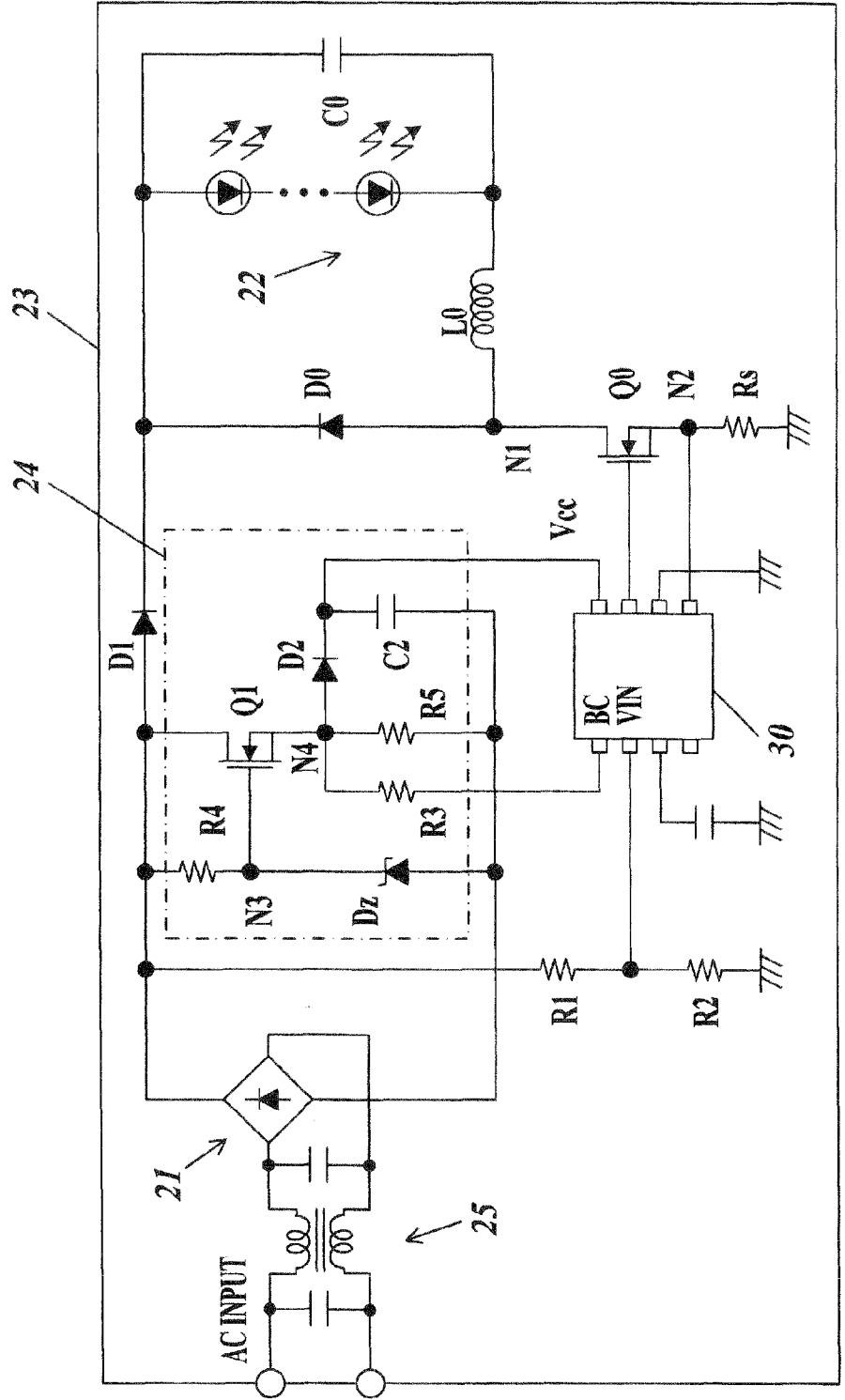
FIG. 9 is a circuit configuration diagram showing a second modification of an LED power supply device according to the example.

FIG. 9 shows a second modification of the LED power supply circuit 23 of FIG. 1.

An LED power supply circuit 23 according to this modification is configured such that, instead of drawing the holding current of the switching element 11 from the output terminal of the rectifying circuit 21, one of terminals of a resistance R3 is connected to a connection node N4 between a resistance R5 and an MOS transistor Q1 constituting a regulator 24 so that the holding current is drawn from the node N4. A sinking MOS transistor Qs is provided as an on-chip device in a control IC 30.

In the LED power supply circuit 23 according to this modification, the gate terminal of the transistor Q1 is fixed to the Zener voltage, and this limits the drain current. Therefore, the magnitude of the drawn current is also limited. In other words, tops of waveforms of the bleeder current shown in the sixth stage ("BLEEDER CURRENT") of FIG. 3 are cut as shown by a broken line. As described above, the drawn current is configured to be limited, so that when the sinking MOS transistor Qs is made as the on-chip device, this prevents a voltage equal to or more than a breakdown voltage from being applied to the MOS transistor Qs.

Figure 10:
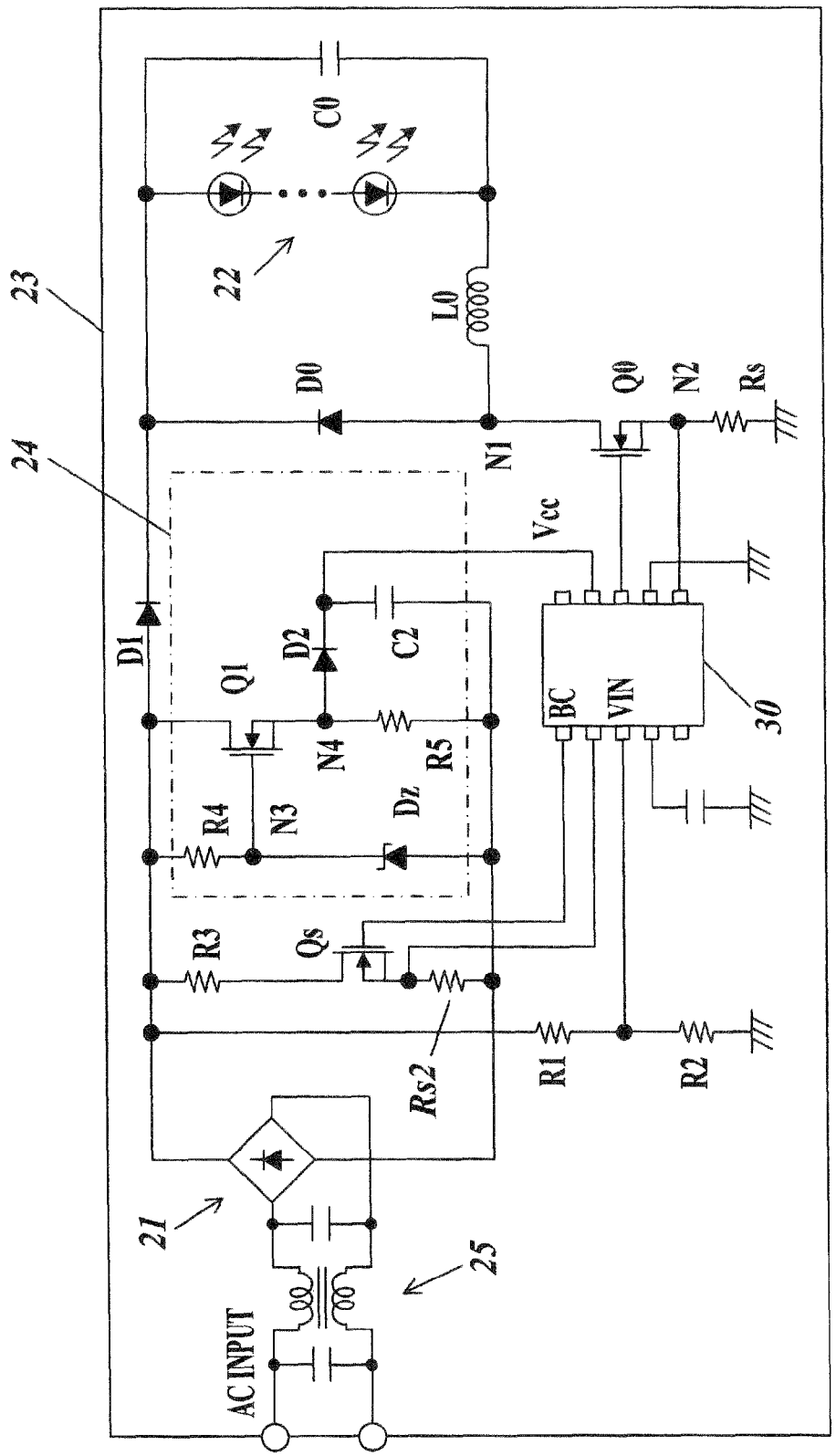
FIG. 10 is a circuit configuration diagram showing a third modification of an LED power supply device according to the example.

FIG. 10 shows a third embodiment of an LED power supply circuit 23.

Similarly to the first modification of FIG. 8, the LED power supply circuit 23 according to this example is configured such that a sinking transistor Qs is provided as an external device attached to the outside of the control IC 30, and a sense resistance Rs2 is connected in series to the transistor Qs. In the control IC 30, a current detection circuit is provided which includes an error amplifier for outputting a voltage depending on a potential difference between a predetermined reference voltage and a voltage converted from current to voltage by the sense resistance Rs2. The holding current control circuit 43 (see FIG. 3) is configured to control the gate voltage of the sinking transistor Qs in accordance with the output of the current detection circuit, and to draw the current while preventing the drawn current from flowing at a predetermined current value or more. The drawn current is limited as described above, so that this can reduce wasteful current and enhance the electric power efficiency.

Although the invention made by the present inventors has been described above specifically based on the examples, the present invention is not limited to the above embodiments. For example, in the above embodiment (FIGS. 8 to 10), the rectifying circuit 21 is provided downstream with respect to the phase control type dimmer 10. Alternatively, the rectifying circuit 21 may be provided upstream with respect to the phase control type dimmer 10.

In the above embodiment, the AC-DC converter 31 includes the switching transistor Q0, the diode D0, and the inductor L0. Alternatively, the AC-DC converter 31 may be configured as a so-called synchronous rectification type switching regulator in which a transistor is used instead of the diode D0 and this transistor is turned ON/OFF by the control IC 30 in a complementary manner with the switching transistor Q0.

The present invention has been hereinabove explained while the present invention is applied to the LED lighting system, i.e., the field of use serving as the background of the present invention. However, the present invention is not limited thereto. The present invention can also be used in a lighting system which uses a lighting device other than the LED lamp to perform dimming by phase controlling.

As described above, according to the present embodiment, in the lighting power supply device which receives the voltage converted from alternating current to the direct current by the rectifying circuit rectifying the alternating current whose phase is controlled by the phase control type dimmer, and generates and outputs the direct current voltage/current to be supplied to the load, while determining whether a phenomenon caused by malfunction of the phase control type dimmer occurs by monitoring the voltage converted by the rectifying circuit or a voltage proportional to the voltage converted by the rectifying circuit, the current drawn from the rectifying circuit is gradually decreased from a predetermined current value set in advance, and the current value immediately before detecting the phenomenon caused by malfunction of the phase control type dimmer is determined as the holding current value.

According to the above means, the minimum necessary holding current can flow through the switching element of the phase control type dimmer, and this can avoid malfunction of the dimmer. In addition, since it is not necessary to make a holding current larger than what is needed flow, the electric power efficiency in the lighting power supply device having the phase control type dimmer can be enhanced.

For example, the control circuit includes: a voltage input terminal which receives the voltage converted by the rectifying circuit or a voltage proportional to the voltage converted by the rectifying circuit; a current drawing terminal which draws a given amount of the current output from the rectifying circuit; a timing detection circuit which is connected to the voltage input terminal, and detects a timing at which the voltage input to the voltage input terminal becomes zero and a timing at which the input voltage rapidly changes; a period determination circuit which determines a period in which the input voltage is not zero on the basis of a detection result provided by the timing detection circuit; a malfunction determination circuit which determines the malfunction of the phase control type dimmer on the basis of the detection result provided by the timing detection circuit; and a current control circuit which controls the current drawn from the rectifying circuit in accordance with the period determined by the period determination circuit.

Therefore, the control circuit can be easily realized, in which the current drawn from the rectifying circuit is gradually decreased from the relatively large current value set in advance, and the current value immediately before the malfunction determination circuit detects malfunction is determined as the holding current value, so that the current control is performed to maintain the current value. The current drawing terminal may be used to directly draw the current, or the current drawing terminal may output a control signal for turning on a switching element for drawing the current.

Preferably, the control circuit further includes: a counter which counts a clock signal of a predetermined frequency in accordance with a signal output from the period determination circuit; a latch circuit which is capable of holding a value counted by the counter; a comparing circuit which compares the value counted by the counter with the value held in the latch circuit at a time when the period ends; an integrator which counts a signal output from the comparing circuit every time the comparing circuit determines that the value counted by the counter matches the value held in the latch circuit; an up/down counter which down-counts a value in response to an output of the integrator, and up-counts the value in response to an output of the malfunction determination circuit; and a decoder which decodes an output of the up/down counter, and the current control circuit controls a transistor for flowing the drawn current in accordance with an output of the decoder.

Therefore, the control circuit for controlling the drawn current value as described above can be made reasonably using an existing function circuit, and the circuit for holding current optimization can be realized with the minimum configuration by making the circuit configuration easy.

Preferably, the control circuit is configured as a semiconductor integrated circuit, and the transistor for flowing the drawn current and controlled by the current control circuit is configured as the same IC as the control circuit.

Since the transistor for flowing the drawn current is configured as the same IC as the control circuit, the number of components constituting the device can be reduced, and the size of the device can be reduced.

Preferably, the control circuit is configured as a semiconductor integrated circuit, the transistor for flowing the drawn current and controlled by the current control circuit is configured as an external device of a semiconductor chip on which the control circuit is formed, and the transistor is controlled in accordance with an output signal of the current control circuit output from the current drawing terminal so that the transistor flows the drawn current.

Since the transistor which makes the drawn current flow is configured as the externally attached device, when a relatively high voltage may be potentially applied to the transistor, the semiconductor integrated circuit device in which the control circuit is formed can be manufactured without using high breakdown voltage process, and the increase of the cost can be prevented. A suitable external transistor can be selected in view of necessary breakdown voltage and heat radiation.

Preferably, the lighting power supply further includes: a current-voltage conversion member which is connected in series with the transistor, and the control circuit further includes a current detection terminal which receives a voltage converted by the current-voltage conversion member, and the current control circuit is configured to control the drawn current flowing by the transistor in accordance with the voltage of the current detection terminal.

Accordingly, the current can be limited so that a very large current does not flow through the transistor for making the drawn current flow, and the electric power efficiency can be enhanced.

Preferably, the lighting power supply device further includes a regulator which contains: a constant voltage source which is connected to an output terminal of the rectifying circuit; an energy accumulation member which is charged by a current of the constant voltage source and which is capable of accumulating the current as electric energy; and a reverse current prevention rectifying device provided between the constant voltage source and the energy accumulation member, and the regulator receives the voltage converted from the alternating current to the direct current by the rectifying circuit to generate a power-supply voltage necessary for an operation of the control circuit, and the transistor used for drawing the current is connected between a grounding point and a connection point between the constant voltage source and the rectifying device, and is configured to draw the current from the output terminal of the rectifying circuit via the constant voltage source.

Since the current is drawn from the output terminal of the rectifying circuit via the constant voltage source, the current can be limited so that a very large current does not flow through the transistor for flowing the drawn current, and the electric power efficiency can be enhanced.

Preferably, the control circuit continues or stops the executed current control, in accordance with a magnitude and change amount of a current flowing through the load. When the current control is stopped, the drawn current immediately before the stop is maintained. When the drawn current continuously controlled after the drawn current value is once determined, the drawn current value may change, and in particular, when the change amount of the drawn current value somewhat increases while the current flowing to the lighting serving as the load is low, the brightness appears to be changing. However, when the drawn current control is stopped in such case, such variation of brightness can be prevented.

As described above, according to the present invention, in the lighting power supply device constituting the lighting system having the phase control type dimmer, the holding current constantly flows through the switching element of the phase control type dimmer, so that malfunction can be avoided. In addition, the minimum necessary holding current can flow through the switching element such as a thyristor, and this results in an effect of improving the electric power efficiency in the lighting power supply device constituting the lighting system having the phase control type dimmer.

The entire disclosure of Japanese Patent Application No. 2010-242155 filed on Oct. 28, 2010, and the entire disclosure of Japanese Patent Application No. 2011-184280 filed on Aug. 26, 2011, each including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A lighting power supply device which receives a voltage converted from an alternating current to a direct current by a rectifying circuit rectifying the alternating current whose phase is controlled by a phase control type dimmer, and generates and outputs a direct current voltage/current to be supplied to a load, the lighting power supply device comprising:
   a control circuit, which gradually decreases a current drawn from the rectifying circuit from a predetermined current value set in advance, determines a current value immediately before detecting a malfunction of the phase control type dimmer as a drawn current value, and performs current control so as to maintain the determined current value;
   wherein the control circuit includes:
   a timing detection circuit which detects a zero-cross timing at which the voltage input to the control circuit becomes zero and an edge timing at which the input voltage rapidly changes;
   a malfunction determination circuit which determines the malfunction of the phase control type dimmer, when the zero-cross timing has not been detected and the edge timing has been detected a predetermined number of times, based on detection results provided by the timing detection circuit.

2. The lighting power supply device according to claim 1, wherein the control circuit includes:
   a voltage input terminal which receives the voltage converted by the rectifying circuit or a voltage proportional to the voltage converted by the rectifying circuit;
   a current drawing terminal which draws a given amount of the current output from the rectifying circuit;
   a period determination circuit which determines a period in which the input voltage is not zero based on the detection results provided by the timing detection circuit; and
   a current control circuit which controls the current drawn from the rectifying circuit in accordance with the period determined by the period determination circuit.

3. The lighting power supply device according to claim 2, wherein the control circuit further includes:
   a counter which counts a clock signal of a predetermined frequency in accordance with a signal output from the period determination circuit;
   a latch circuit which holds a value counted by the counter;
   a comparing circuit which compares the value counted by the counter with the value held in the latch circuit at a time when the period ends;
   an integrator which counts a signal output from the comparing circuit every time the comparing circuit determines that the value counted by the counter matches the value held in the latch circuit;
   an up/down counter which down-counts a value in response to an output of the integrator, and up-counts the value in response to an output of the malfunction determination circuit; and
   a decoder which decodes an output of the up/down counter, wherein the current control circuit controls a transistor for flowing the drawn current in accordance with an output of the decoder.

4. The lighting power supply device according to claim 2, wherein the control circuit is configured as a semiconductor integrated circuit, and a transistor for flowing the drawn current and controlled by the current control circuit is configured as the same semiconductor integrated circuit as the control circuit.

5. The lighting power supply device according to claim 2, wherein the control circuit is configured as a semiconductor integrated circuit, a transistor for flowing the drawn current and controlled by the current control circuit is configured as an external device of a semiconductor chip on which the control circuit is formed, and the transistor is controlled in accordance with an output signal of the current control circuit output from the current drawing terminal so that the transistor flows the drawn current.

6. The lighting power supply device according to claim 5, further comprising:
   a current-voltage conversion member which is connected in series with the transistor,
   wherein the control circuit further includes a current detection terminal which receives a voltage converted by the current-voltage conversion member, and the current control circuit is configured to control the drawn current flowing by the transistor in accordance with the voltage of the current detection terminal.

7. The lighting power supply device according to claim 4, further comprising a regulator including:
   a constant voltage source which is connected to an output terminal of the rectifying circuit;

an energy accumulation member which is charged by a current of the constant voltage source and which accumulates the current as electric energy; and a reverse current prevention rectifying device provided between the constant voltage source and the energy accumulation member, wherein the regulator receives the voltage converted from the alternating current to the direct current by the rectifying circuit to generate a power-supply voltage necessary for an operation of the control circuit, and wherein the transistor used for drawing the current is connected between a grounding point and a connection point between the constant voltage source and the rectifying device, and is configured to draw the current from the output terminal of the rectifying circuit via the constant voltage source.

8. The lighting power supply device according to claim 1, wherein the control circuit continues or stops the executed current control, in accordance with a magnitude and change amount of a current flowing through the load.

9. A method for controlling a holding current for a lighting power supply device which includes (i) a switching element for intermittently flowing a current through an inductor connected in series with a lighting device serving as a load; and a control circuit for driving the switching element, and wherein the lighting power supply device receives a voltage converted from an alternating current to a direct current by a rectifying circuit rectifying the alternating current whose phase is controlled by a phase control type dimmer to generate and output a direct current voltage/current supplied to the load, the method comprising:

controlling the control circuit to gradually decrease the current drawn from the rectifying circuit from the predetermined current value set in advance, while detecting a zero-cross timing at which an input voltage becomes zero and an edge timing at which the input voltage rapidly changes, the input voltage being the voltage converted by the rectifying circuit or a voltage proportional to the voltage converted by the rectifying circuit, and judging whether a phenomenon in which the zero-cross timing has not been detected while the edge timing has been detected a predetermined number of times occurs, and controlling the control circuit to determine a malfunction of the phase control type dimmer when the phenomenon has been judged to occur, and to determine, as a holding current value, the current value immediately before detecting the phenomenon so that the control circuit controls the current to be drawn.

10. The method according to claim 9, further comprising controlling the control circuit to continue or stop the executed current control, in accordance with a magnitude and change amount of a current flowing through the lighting device serving as the load.

* * * * *

UNITED STATES PATENT AND TRADEMARK OFFICE
CERTIFICATE OF CORRECTION

PATENT NO. : 8,988,002 B2  
APPLICATION NO. : 13/282688  
DATED : March 24, 2015  
INVENTOR(S) : Takashi Okubo et al.

Page 1 of 1

It is certified that error appears in the above-identified patent and that said Letters Patent is hereby corrected as shown below:

Claims

Column 13, claim 1, line 8, delete "circuit," and insert --circuit--.

Column 15, claim 9, line 4, delete "and" and insert --and (ii)--.

Signed and Sealed this  
Twelfth Day of January, 2016

Michelle K. Lee  
*Director of the United States Patent and Trademark Office*